United States Patent [19]

Macachor

[11] Patent Number: 4,656,776

[45] Date of Patent: Apr. 14, 1987

[54] FISHING LINE RELEASE DEVICE

[76] Inventor: Jesus D. Macachor, 1135 Ridgeway Rd., Brookfield, Wis. 53005

[21] Appl. No.: 836,322

[22] Filed: Mar. 5, 1986

[51] Int. Cl.⁴ ............................................. A01K 91/06
[52] U.S. Cl. .................................. 43/43.12; 43/44.88
[58] Field of Search ................ 43/43.12, 44.88, 44.91, 43/44.92

[56] References Cited

U.S. PATENT DOCUMENTS

| | | |
|---|---|---|
| 2,858,637 | 11/1958 | Stark . |
| 3,081,575 | 3/1963 | Meisner . |
| 3,659,370 | 5/1972 | Ritter . |
| 3,765,118 | 10/1973 | Reitler . |
| 3,874,110 | 4/1975 | Larson ............................ 43/43.12 |
| 3,925,920 | 12/1975 | Walker . |
| 4,031,652 | 6/1977 | Johnson . |
| 4,069,611 | 1/1978 | Dusich . |
| 4,177,599 | 12/1979 | Pettersen . |
| 4,261,130 | 4/1981 | Cudnohufsky ................. 43/43.12 |
| 4,417,414 | 11/1983 | Hood ................................ 43/43.12 |
| 4,430,823 | 2/1984 | Henze ............................... 43/43.12 |

*Primary Examiner*—Nicholas P. Godici
*Assistant Examiner*—Kurt Rowan
*Attorney, Agent, or Firm*—Fred Wiviott

[57] ABSTRACT

A fishing line release device includes a body adapted to be attached to a downrigger line and having projections adjacent one end about which the fishing line can be wound. A first magnetic member is the releasably positionable at plural points along the body which defines a path extending toward and away from the projections. A release lever is pivotally mounted on the body and is constructed and arranged such that when the lever is in an unpivoted position a first arm extends in a direction parallel to the path and a second arm is positioned adjacent the projections to hold the fishing line thereon and whereby a force on the fishing line tends to pivot the lever to move the second arm away from the projections and release the fishing line. A second magnet is slidably mounted on the first arm for being attracted by the first magnet thereby resisting pivotal movement of the lever with the degree of force required to release the fishing line being dependent on the position of the first magnet along the path.

10 Claims, 6 Drawing Figures

FISHING LINE RELEASE DEVICE

BACKGROUND OF THE INVENTION

In one fishing method calling trolling, a fishing line is pulled behind a slowly moving boat. Because the forward movement of the boat tends to cause the relatively light fishing line, lure and hook to rise in the water, a device called a downrigger is employed to maintain the hook and lure at the desired depth for the type of fish being sought. Downriggers generally consist of a relatively heavy weighted line to which the fishing line is coupled by a mechanism which releases the fishing line when the fish takes the baited hook.

Various types of downrigger release mechanisms have been employed. For example, in one type of device the fishing line is wrapped around a first element which is frictionally held by a second element secured to the downrigger line. The fishing line is released when sufficient force is applied to separate the elements. This type of release device is shown, for example, in U.S. Pat. Nos. 3,765,118; 4,069,611; and 4,177,599.

Another type of prior art release device holds the fishing line to the downrigger line by a spring biased retaining element. The fishing line is released when a fish exerts sufficient pull to overcome the retaining spring. Release elements of this type are shown, for example, in U.S. Pat. Nos. 2,858,637; 3,659,370; and 3,925,920.

Prior art release devices of the types discussed have not been entirely satisfactory because they tend to abrade or kink the fishing line. Another shortcoming of such devices is that the required release force cannot be readily adjusted for the requirements of different species of fish.

One attempt to overcome these shortcomings is disclosed in U.S. Pat. No. 4,031,652. This device employs an adjustable permanent magnet attached to the downrigger line and a magnetic member mounted on the fishing line. By adjusting the position of the permanent magnet, the degree of magnetic attraction between the magnet and the magnetic member can be controlled. While this device does permit some adjustment of the required release force, the magnetic member remains attached to the fishing line after release thereby creating a drag which might be sensed by some fish causing them to release the bait. Additionally, the removable release member could become lost if the line parts or if it slides off the end of the line.

SUMMARY OF THE INVENTION

It is an object of the invention to provide a new and improved downrigger release device.

Another object of the invention is to provide a downrigger release device which does not tangle, abrade or kink the fishing line.

A further object of the invention is to provide a downrigger release device having no parts which are separable during operation.

Yet another object of the invention is to provide a downrigger release device which may be adjusted for the requirements of different fish.

These and other objects and advantages of the invention will become more apparent from the detailed description of the preferred embodiment taken with the accompanying drawings.

In general terms, the invention comprises a body adapted to be attached to an outrigger line and having projecting means at one end about which a fishing line can be wound.

First magnetic means are slidably mounted on the body for movement along a path extending toward and away from the projecting means, and means are provided for releasably securing the first magnetic means in various positions along the path. Lever means is mounted on the body for movement between pivoted and unpivoted positions and includes first and second lever arms. The first lever extends in a direction generally parallel to the path and the second lever arm is positioned adjacent the projections to hold the fishing line thereon when the lever means is in an unpivoted position. A second magnetic means is slidably mounted on the first lever arm for being positioned thereon adjacent the first magnetic means whereby the second magnetic means is attracted to the first magnetic means so that the magnetic attraction must be overcome to pivot the lever means from its unpivoted to its pivoted position with the moment of force required being directly related to the position of the first magnetic means along the path. As a result, the pull required to pivot the lever means and thereby release said fishing line can be adjusted for the requirements of different fish.

DETAILED DESCRIPTION OF THE PREFERRED EMBODIMENT

Figure 1:
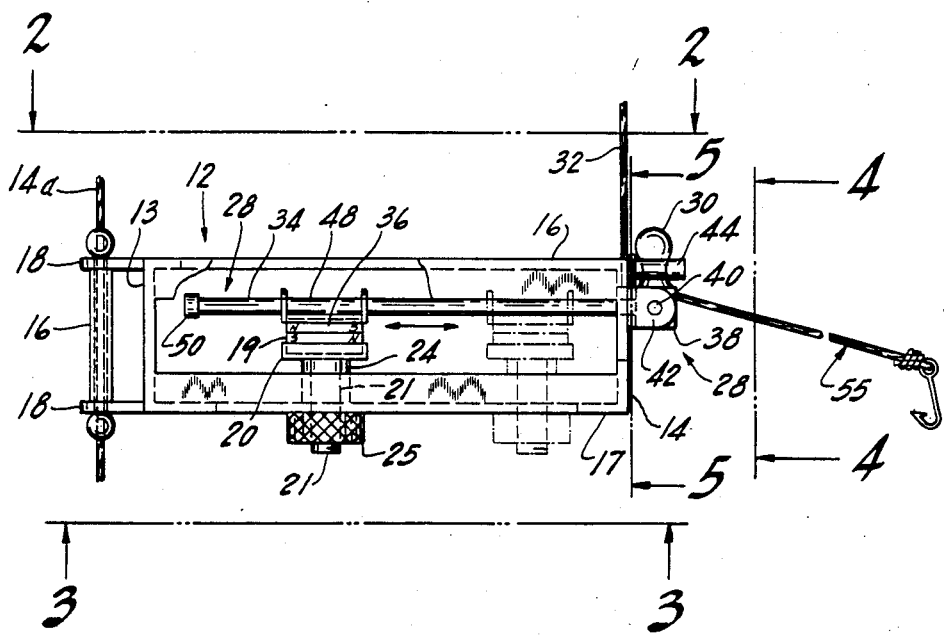
FIG. 1 is a side elevational view, with parts broken away, of the downrigger release mechanism in accordance with the preferred embodiment of the invention.
Figure 2:
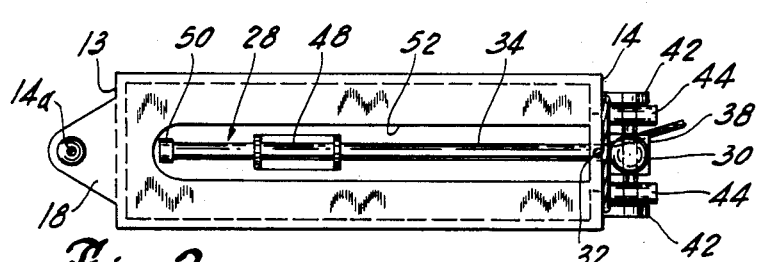
FIG. 2 is a view taken along lines 2—2 of FIG. 1.

The downrigger release 10 according to the preferred embodiment of the invention includes a generally rectangular tubular body 12 having end plates 13 and 14, a top wall 16 and a bottom wall 17. Body 12 may be attached to a downrigger line 14a in any suitable manner, such as by means of a tubular member 16 which is mounted at one end of body 12 by brackets 18 extending perpendicularly from end plate 13.

A first magnet 19 is disposed within body 12 and is mounted for movement in a direction generally perpendicular to the end wall 14 which direction will hereinafter be referred to as the axial direction. In particular, magnet 19 is mounted in a holder 20 secured to the upper end of a screw 21 which extends downwardly through an elongate slot 22 formed in the bottom wall 17 and extending in the axial direction. An annular spacer 24 is disposed in surrounding relation to the screw 21 and between the magnet 19 and the lower wall 17. A clamp nut 25 is threadably received on the screw 21 and has a planar surface 26 adapted to engage the bottom wall 17 when the nut 25 is tightened. It will be appreciated that when the nut 25 is loose, the magnet 19 may be moved in the axial direction to the extent permitted by the slot 22 and may be clamped in this position by tightening the nut 25.

The release 10 also includes a generally L-shaped release lever 28 which is pivotally mounted on the front plate 14 and has a first arm 30 for retaining the fishing line 32 and a second arm 34 which carries a second magnet 36 for cooperating with the first magnet 19 to establish the force required for actuation. The arms 30 and 34 extend at right angles to each other from a pivot block 38. Also extending from the block 38 and perpendicularly relative to the arms 30 and 34 are a pair of pivot pins 40. The outer ends of pins 40 are pivotally received in a pair of brackets 42 projecting forwardly from the front plate 14. Also extending forwardly from the front plate 14 and in general parallelism to each other and in the axial direction are a pair of parallel lugs 44. It can be seen that the lugs 44 are located above the block 38 and spaced apart a distance greater than the thickness of the arm 30. In addition, the lugs 44 extend forwardly a distance greater than that of the arm 30 from the front plate 14. Seen in FIG. 4, the arm 30 extends backwardly into the body 12 through an opening 46 into the front plate 14.

While a pair of permanent magnets 19 and 36 are shown, one of the members 19 or 36 may be a permanent magnet and the other may be a ferrous material which is magnetically attractive. The remaining portions of the device are preferrably non-magnetic.

The second magnet 36 is suspended from a tubular slide member 48 loosely received on the arm 34. Magnets 19 and 36 are arranged such that the poles of one will be aligned with the opposite poles of the other when the magnets are disposed in a side-by-side relation as shown in FIG. 1. Because magnet 19 will be fixed once adjusted and because the magnet is freely movable on arm 34, the magnet 36 will always seek the position on arm 34 which is adjacent to magnet 19. A knob 50 is fixed to the end of arm 34 to prevent the sleeve 48 from sliding off. In order to permit free pivotal movement of the release lever 28, a slot 52 is formed in the upper wall 16 and extends in the axial direction for a distance at least equal to the length of arm 34.

Figure 4:
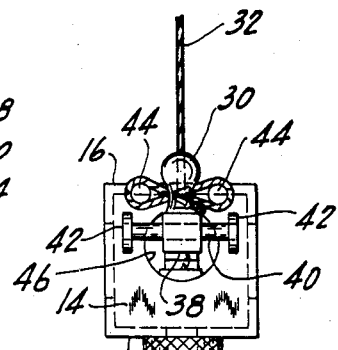
FIG. 4 is a view taken along lines 4—4 of FIG. 1.
Figure 3:
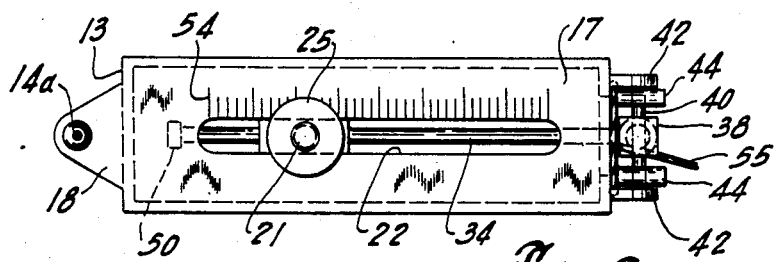
FIG. 3 is a view taken along lines 3—3 of FIG. 1.
Figure 5:
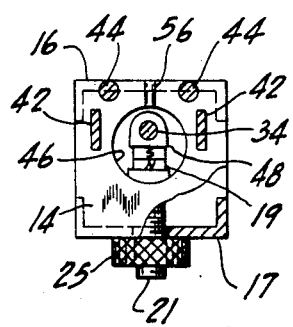
FIG. 5 is a view taken along lines 5—5 of FIG. 1.

In operation, the nut 25 is first loosened and the magnet 19 is moved to a position on slot 22 which is appropriate for the fish being sought. A scale of 54 may be provided on the bottom wall 17 to facilitate positioning of magnet 19 in the appropriate location. The release arm 28 is then pivoted to its position shown in FIG. 6 so that the short arm 30 is pivoted away from the lugs 48. The fishing line 32 is then wound in a FIG. 8 around the lug 44 as shown in FIG. 4. It will be appreciated that one end of the fishing line 32 will extend upwardly to the pole or rod to which it is connected while the other end will carry a hook, bait and lure as required. To facilitate the positioning the upwardly extending portion of the fishing line 32, a groove 56 will be formed in the front plate 17 between the lugs 44. To minimuze abrasion, the lugs 44 are preferably of a plastic material.

Figure 6:
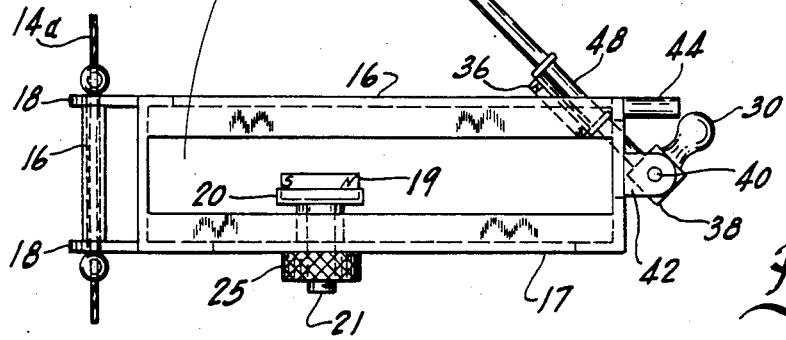
FIG. 6 shows the mechanism of FIG. 1 in its position after release of the fishing line.

After the fishing line has been wound about the lugs 44, the release arm 38 is pivoted from its position shown in FIG. 6 to its position shown in FIG. 1 wherein the short arm 30 moves upwardly into engagement with the portion of the fishing line between the lugs 44. This prevents the fishing line from moving forwardly and slipping off of the ends of lugs 44 whereby the fishing line is clamped in position. After the arm 34 has been pivoted downwardly, the sliding magnet 36 will be moved on arm 34 so that it engages the fixed magnet 19 as shown in FIG. 1. When the device has been set as shown in FIG. 1, it may then be lowered into the water along with the downrigger line. Should a fish take the hook 55, that portion of the line 32 which is looped around lugs 44 will be moved forwardly causing the intersection of the loops to engage the short arm 30. If the force exceeds the force required to separate the magnets 19 and 36, the release lever 28 will pivot from its position shown in FIG. 1 to its position shown in FIG. 6, thereby moving the short arm 30 away from the lugs 44 so that the fishing line can slide off and be taken by the fish.

Those skilled in the art will appreciate that the force necessary to pivot arm 28 will be the product of the attraction force of the magnets 19 and 36 multiplied by the moment arm that this force acts from the pivot axis of the pins 40. The longer the moment arm, the greater the required force. Thus, if only light force is desired for a particular fish, the magnet 19 is positioned close to the axes of pins 40 as shown by broken lines in FIG. 1. However, if a greater force is desired, the magnet 19 is positioned outwardly toward the end of the arm 34. In this manner, the release force can accurately be adjusted for use with different fish.

It should also be noted that the force tending to pivot the release arm 28 acts in a direction generally normal to the end plate 14. The upwardly extending portion of the fishing line 32 however acts in a direction parallel to the end plate 14 and accordingly does not tend to trip the release lever 28 should a force be exerted in the upward direction.

While only a single embodiment of the invention has been illustrated and described, and it is not intended to be limited thereby but only by the scope of the appended claims.

I claim:

1. A downrigger release comprising a body adapted to be attached to an outrigger line and having fishing line receiving means at one end about which a fishing line can be wound,
    first magnetic means mounted on the body for movement along a path extending toward and away from the fishing line receiving means,
    means for releasably holding the first magnetic means in various positions along the path,
    lever means pivotally mounted on the body and having pivoted and unpivoted positions, said lever means including first and second portions, said first portion extending in a direction generally parallel to the path and said second portion positioned being adjacent the fishing line receiving means to hold the fishing line thereon when the lever means is in an unpivoted position,
    a second magnetic means mounted on the first lever portion for movement to positions thereon adjacent the first magnetic means whereby the magnetic attraction between said magnetic means must be overcome to pivot the lever means from its unpivoted to its pivoted position with the force required to pivot said lever means being directly related to the position of the first magnetic means along the path so that the pull required to pivot said lever means and thereby release said fishing line can be adjusted for the requirements of different fish.

2. The release set forth in claim 1 wherein said body has a first slot formed therein and defining said path, said first magnetic means being mounted for sliding movement in said slot, the first portion of said lever means comprising a first lever arm and the second portion of said lever means comprising a second lever arm, said second magnetic means being slidably mounted on the first lever arm.

3. The downrigger release set forth in claim 2 wherein said fishing line receiving means comprises a pair of spaced projecting means, said body includes a surface extending between said projecting means, said lever means being pivoted on said body about a pivot axis, said second lever arm extending from said pivot axis to a position between said projecting means when said lever means is in an unpivoted position whereby fishing line wound about said projecting means and disposed between said surface and the second lever arm will be held in position until said lever means moves to its pivoted position.

4. The downrigger release set forth in claim 3 wherein said surface has an opening formed therein, said first lever arm extending through said opening and into said body, said first lever arm extending for substantially the entire length of said body, a second slot formed in said body on the side opposite said first slot to permit said first lever arm to move therethrough when the lever means moves between its pivoted and unpivoted positions.

5. The downrigger release set forth in claim 1 including a surface formed at the one end of said body, said fishing line receiving means comprising a pair of spaced apart projections extending from said body, said lever means being pivoted on said body about a pivot axis substantially parallel to a line extending between said projections, the second lever portion extending from said pivot axis to a position between said projections when said lever means is in its unpivoted position whereby fishing line wound about said projections and disposed between said surface and the second lever portion will be held in position until said lever means moves to its pivoted position.

6. The downrigger release set forth in claim 5 wherein said surface has an opening formed therein, said first lever portion extending through said opening and for substantially the entire length of said body, and a slot formed in said body to permit said first lever portion to move therethrough as the lever means moves between its pivoted and unpivoted positions.

7. The downrigger release set forth in claim 4 wherein said first and second magnetic means comprise first and second permanent magnets.

8. The downrigger set forth in claim 4 wherein one of said magnetic means comprises a permanent magnet and the other comprises a ferrous material.

9. A downrigger release mechanism including, an elongate tubular body having means at one end adapted to be attached to an outrigger line and a surface formed at the opposite end, a pair of projections extending in a spaced apart relation outwardly from said surface and constructed and arranged to have a fishing line wound therearound so that a portion of said line extends across said surface and between said projections, first magnetic means slidably mounted on the body for movement in a path extending toward and away from the projections, means for releasably holding the first magnetic means in various positions along the path, lever means pivotably mounted on the body adjacent said surface and having pivoted and unpivoted positions, said lever means including first and second lever portions, said first lever portion extending in a direction generally parallel to the path and adjacent said first magnetic means and said second lever portion extending between said projections and adjacent said surface when the lever means is in an unpivoted position, second magnetic means mounted on the first lever portion for free movement thereon to positions thereon adjacent the first magnetic means, whereby the magnetic attraction between said magnetic members must be overcome to pivot the lever means from its unpivoted to its pivoted position with the force required to pivot said lever means being directly related to the position of the first magnetic means along the path so that the pull required to pivot said lever means and thereby release said fishing line can be adjusted for the requirements of different fish.

10. The release set forth in claim 9 wherein said body has a first slot extending longitudinally therein and defining said path, said first magnetic means being slidably mounted in said slot, the first portion of said lever means comprising a first lever arm and the second portion of said lever means comprising a second lever arm, said second magnetic means being freely movable on said first lever arm.

* * * * *